Patented Jan. 13, 1953

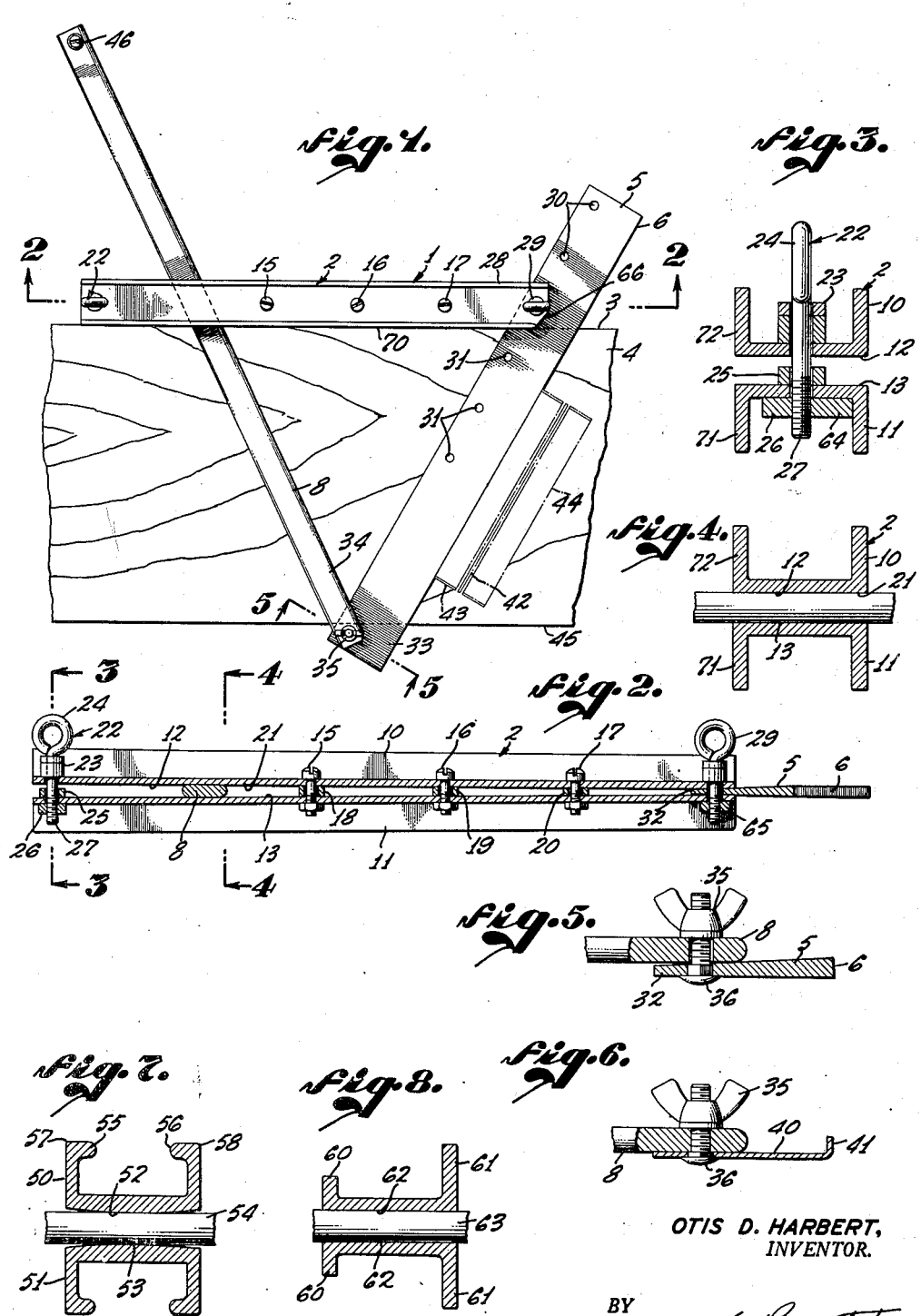

2,625,184

UNITED STATES PATENT OFFICE 2,625,184

GUIDE FOR ELECTRIC HANDSAWS

Otis D. Harbert, Covina, Calif.

Application March 28, 1949, Serial No. 83,880

2 Claims. (Cl. 143—6)

The invention relates to a guide for electric handsaw and has for an object to provide a guide which is adjustable so as to make the same cut at any one of a number of various angles, while bracing the guide against displacement by the electric handsaw. When the guide is set for a chosen angle of cut, a plurality of boards or the like can be cut at the same angle with a saving in time over the usual practice of using one cut board as a pattern to mark the remainder.

For further details of the invention reference may be made to the drawings wherein Fig. 1 is a plan view of a guide for an electric handsaw according to the present invention, the saw being illustrated in broken lines.

Fig. 2 is an enlarged cross sectional view on line 2—2 of Fig. 1, looking in the direction of the arrows.

Figs. 3 and 4 are enlarged sectional views on lines of the corresponding numbers in Fig. 2 looking in the direction of the arrows.

Fig. 5 is a sectional view on line 5—5 of Fig. 1 looking in the direction of the arrows.

Fig. 6 is a sectional view corresponding to Fig. 5, showing a modified form of guide member.

Figs. 7 and 8 are sectional views corresponding to Fig. 4 showing modified forms of channel members for the head of the guide.

Referring in detail to the drawings, the saw guide 1 comprises a head 2 having a straight edge 70 to be placed against the edge 3 of a board 4 to be cut, a guide member 5 having a straight edge 6 to guide the portable electric motor driven saw indicated at 42, and a brace 8 to steady the guide 5 and prevent its displacement when guiding the saw 42.

The head 2 as shown in Figs. 3 and 4 comprises a pair of elongated U-channels 10 and 11, preferably of aluminum, arranged in reverse position, i. e., with the bottom 12 of channel 10 facing the bottom 13 of channel 11. The straight edge 70 is provided by the flange 71 of the channel 11, although the opposed flange 72 of channel 10 can be used as a straight edge also, when the guide 1 is turned over as later described. Flanges 71, 72 lie in a common plane.

As shown in Fig. 2, the channels 10 and 11 are supported in spaced relation by bolts 15, 16, 17, each thereof having a washer or spacer 18, 19, 20 respectively between the channels so as to hold them apart and provide a slot 21 to slidably house an adjustable extended portion of the brace 8.

The channels 10 and 11 at the left end portion thereof as seen in Fig. 2 have a wing bolt 22 having (1) a washer 23 between the channel 10 and the head 24 of the bolt, (2) a washer 25 which is of less thickness than washer 18, between the channel bottoms 12 and 13, and (3) a nut 26 on the outside of the channel bottom 13 for the threaded end 27 of the bolt 22.

As shown in Fig. 3 the nut 26 for the bolt 22 has a radial dimension indicated at 64 greater than one-half the inside width of the channel, to strike the side of the channel and stop rotation of the nut when the bolt is operated. The same is true of the corresponding nut 65 for the bolt 29.

As washer 25 is thinner than washer 18, bolt 22 can be screwed in to clamp the channel bottoms 12 and 13 onto the brace 8, which is thicker than washer 25, the channels 10 and 11 having sufficient inherent spring action or flexibility for this purpose.

At the other end portion 28 of the head 2 there is provided a wing bolt 29, like bolt 22, to hinge and clamp the guide 5 between the channel bottoms 12 and 13. The inner edge of the saw guide 5 has a linear array of spaced apertures indicated at 30, each adapted to receive the bolt 29 so that the position of the guide 5 in the bolt 29 can be varied. The bolt 29 can be adjusted to fit one of the inner apertures indicated at 31, or an outer aperture 30, suitable for the wide board to be cut. A wide adjustment does not interfere with cutting narrow boards.

The guide 5 may be tapered in cross section, having a relatively thin inner edge 32 to be clamped between the channels 10 and 11, and a wider straight edge 6 to serve as a guide for the saw.

The end 33 of the guide 5 and the end 34 of the brace 8 are hinged and clamped together by the wing nut 35 and bolt 36 shown in Fig. 5. The outer end of brace 8 has a stop bolt 46.

As the inner edge 32 of the guide 5 is thin, there is very little offset in a direction at right angles to the plane of the drawings of the end 32 from slot 21 of the brace 8, which makes it possible to adjust the guide 5 to a position having a small angle with the head 2. This offset can also be avoided by making the guide of the sheet metal, as indicated at 40 in Fig. 6, the straight edge of the guide being bent up at right angles, as indicated at 41, to provide a broad surface, comparable to the straight edge 6 to form a substantial guide for the shoe 43 of the saw 42. As shown in broken lines in Fig. 1, the motor driven saw is indicated at 42, and it rotates between shoes, indicated at 43 and 44. The shoes 43 and 44 also have straight edges and the saw is guided by sliding the shoe such as 43 along the surface 6 or 41, due allowance being made for the width of the shoe, when making a cut.

The head 2 serves as a handle and a right-handed person would hold it in the left and pull it against the far edge 3 of the board while pushing the saw outwardly along the guide 5 toward the far edge of the board indicated at 3. The head 2 thus serves as a back stop for the force of the push applied on the saw. The saw guide 1 can be used in a similar way by a left-handed person by turning it upside down from the position shown in Fig. 1, with the head at the same far edge 3 of the board, but with the guide 6 at the left end of the head 2.

If desired the head 2 can also be placed against the near edge 45 of the board, upside down or not, to position the guide 5 at either the right or the left end of the head 2.

The clamp provided by channels 10, 11 of the head 2 may take various other forms. For example, as shown in Fig. 7, the channels 50 and 51 may have convex bottoms as indicated at 52, 53 to clamp the brace 54 corresponding to brace 8. Also the channels at their outer ends may have inturned flanges like 55, 56 and the outer corners may be slightly rounded as indicated at 57, 58 to provide a more comfortable handle. Also, as shown in Fig. 8, one flange 60 of the channel may be shorter than the other flange 61, with flat bottoms like 62 to clamp the brace 63, corresponding to brace 8.

The end 34 of brace 8 and its bolt 36 are set back from the straight edge 6 and the corner 66 of the head 2 is cut away so as to leave a clear space inwardly from edge 6 sufficient to pass the motor of the saw.

When the bolts 22, 29 and wing nut 35 are tightened, there is provided a rigid triangular structure with little likelihood that the guide 5 will be displaced when in use. When bolts 22, 29 and wing nut 35 are loosened, the guide 5 can be adjusted to various angles in relation to the head 2. The guide 1 makes it possible to save a substantial amount of time in making the same angular cut on a plurality of boards. Also a compound angle can be cut by making the necessary tilt adjustment to the saw 42.

When the guide 1 is in position on a board, the guide member 5 rests flat on the board and only the lower one of the channels 10 or 11, in this case channel 11, rests against the far edge 3 of the board.

By removing nut 35 and bolt 36, and by loosening bolt 22 and by loosening or removing bolt 29, the head 2, guide 5 and brace 8 can be disassembled and superposed or stacked to form a compact assembly for packing.

While various dimensions may be used, the head 2 for example may be 16 inches long with the other parts in proportion.

Various other modifications may be made in the invention without departing from the spirit of the following claims. For example, the guide 5 may be of uniform thickness and the inner end of brace 8 bent slightly with an offset to compensate for such thickness, so that brace 8 will lie substantially in the plane of the slot between the channels like 10 and 11 and, hence, not bind when the saw guide 5 is adjusted to small angles with respect to the head 2.

I claim:

1. A guide for an electric hand saw, said guide comprising a straight edge head comprising a pair of angle members having spaced bottoms with oppositely extending flanges lying substantially in a plane, means supporting said bottoms spaced apart and extending outwardly of said plane to provide a slot outwardly of said plane at one end of said angle members, and a straight edge saw guide member having a rear edge fitting in said slot and a front edge outwardly disposed of said one end of said angle members, a plurality of spaced holes along said rear edge, and a clamp bolt at said end of said angle members for clamping said rear edge between said angle members, said bolt fitting any one of said holes for adjusting the extension of said saw guide member beyond said head.

2. A guide for an electric hand saw comprising a head having a pair of members having oppositely extending flanges lying in a plane, said members each having a bottom extending outwardly of said plane, a saw guide having a rear edge and a straight edge, and a clamp bolt at one end of said members for clamping said rear edge between the bottoms of said members with said straight edge outwardly disposed from said end of said members, and a brace between said head and said saw guide, said saw guide and said brace comprising means for supporting the guide in position on a work piece with one of said flanges serving an edge of the work piece, or in reversed position with the other of said flanges serving said work piece edge.

OTIS D. HARBERT.

REFERENCES CITED

The following references are of record in the file of this patent:

UNITED STATES PATENTS

| Number | Name | Date |
| --- | --- | --- |
| 818,958 | Hause et al. | Apr. 24, 1906 |
| 830,322 | Hodge | Sept. 4, 1906 |
| 985,950 | Smith | Mar. 7, 1911 |
| 1,056,917 | Len | Mar. 25, 1913 |
| 1,700,189 | Wikstrom | Jan. 29, 1929 |
| 2,198,948 | Park | Apr. 30, 1940 |